(12) United States Patent
Dorst et al.

(10) Patent No.: US 11,456,780 B2
(45) Date of Patent: Sep. 27, 2022

(54) RFID TAG WITH ANTENNA DE-ACTIVATION SWITCH

(71) Applicant: GENTEX CORPORATION, Zeeland, MI (US)

(72) Inventors: Jonathan E. Dorst, Holland, MI (US); Thomas D. Klaver, Ada, MI (US); Todd R. Witkowski, Zeeland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 17/194,748

(22) Filed: Mar. 8, 2021

(65) Prior Publication Data
US 2021/0279541 A1    Sep. 9, 2021

Related U.S. Application Data

(60) Provisional application No. 62/987,005, filed on Mar. 9, 2020.

(51) Int. Cl.
*H04B 5/00* (2006.01)
*G06K 19/077* (2006.01)
*G06K 19/073* (2006.01)
*G08B 13/24* (2006.01)

(52) U.S. Cl.
CPC ..... *H04B 5/0062* (2013.01); *G06K 19/07749* (2013.01); *H04B 5/0031* (2013.01); *G06K 19/0739* (2013.01); *G08B 13/242* (2013.01); *G08B 13/2417* (2013.01)

(58) Field of Classification Search
CPC . B60K 6/48; B60K 6/485; B60K 6/52; B60K 6/547; B60W 20/00; B60W 20/15; B60W 2510/0208; B60W 2510/1015; B60W 2520/10; B60W 2540/14; B60W 2540/16; B60W 2710/0644; B60W 2710/0666; B60W 50/082; G06K 19/0739; G06K 19/07749; G08B 13/2417; G08B 13/242; H04B 5/0031; H04B 5/0062; Y02T 10/62
See application file for complete search history.

(56) References Cited

U.S. PATENT DOCUMENTS

| | | | |
|---|---|---|---|
| 2003/0132301 A1 | 7/2003 | Selker | |
| 2007/0109101 A1* | 5/2007 | Colby | G06K 19/0723 340/10.4 |
| 2010/0156642 A1* | 6/2010 | Lindsay | G06K 19/0716 340/572.7 |

(Continued)

FOREIGN PATENT DOCUMENTS

EP      2710524 B1    4/2015

*Primary Examiner* — Omer S Khan
(74) *Attorney, Agent, or Firm* — Price Heneveld LLP; Brian James Brewer

(57) ABSTRACT

A system, device, and method are disclosed for reducing or eliminating interference between proximate electronic devices. The system, device, and method rely on a switch communicatively disposed between a signal origination device and an antenna. Further, the switch is connected to an electronic device and is operable to receive a signal from the electronic device corresponding to whether the electronic device is in an activated or de-activated state. Additionally, when the electronic device is in an activated state, the switch is operable to open, preventing communication between the signal origination device and the antenna.

13 Claims, 2 Drawing Sheets

(56) References Cited

U.S. PATENT DOCUMENTS

2010/0230498 A1 9/2010 Atherton
2011/0250841 A1* 10/2011 Hulvey .............. H04W 52/287
455/41.1

* cited by examiner

RFID TAG WITH ANTENNA DE-ACTIVATION SWITCH

CROSS-REFERENCE TO RELATED APPLICATIONS

This application claims priority under 35 U.S.C. § 119(e) to U.S. Provisional Application No. 62/987,005 filed on Mar. 9, 2020, entitled "RFID TAG WITH ANTENNA DE-ACTIVATING SWITCH," the disclosure of which is hereby incorporated by reference in its entirety.

FIELD OF INVENTION

The present invention relates in general to signal interference reduction and, more particularly, the reduction of interference caused by proximate electronic devices.

BACKGROUND OF INVENTION

Signal interference is a significant problem, particularly in today's technology landscape where the number of devices enabled with wireless communication capabilities is immense and growing exponentially. Interference may occur when an unwanted signal having a similar frequency to a frequency of a desired signal is present, causing a disruption in the receipt of the desired signal. Further, as the number of wirelessly communicating devices grow, the likelihood of proximate devices transmitting and/or receiving signals at a same or similar frequency grows. Accordingly, there is a need for improved systems that reduce, minimize, or eliminate signal interference caused by proximate devices.

SUMMARY

In accordance with the present disclosure, the disadvantages and problems associated with proximate devices transmitting and/or receiving signals at a same or similar frequency and causing signal interference, have been substantially reduced or eliminated.

In accordance with one aspect of the present disclosure, a system is disclosed. The system may comprise a signal origination device, a switch, an antenna, and an electronic device. The signal origination device may be operable to communicate a first signal when in a presence of a second signal. Accordingly, the signal origination device may be a passive RFID tag. Further, the first signal may be within a first frequency range. Similarly, the second signal may be within a second frequency range. The switch may be connected to the signal origination device. The antenna may be connected to the switch and operable to transmit the first signal. The electronic device may be operable between activated and de-activated states. Further, the electronic device may be connected to the switch. Additionally, the switch may be operable to open when the electronic device is in an activated state, and/or likewise, close when the electronic device is in a de-activated state, enabling and disabling communication between the signal origination device and the antenna, respectively.

In some embodiments, the electronic device, when in an activated state may be further operable to transmit a fourth signal within a fourth frequency range. In other embodiments, the electronic device, when in the activated state may be operable to receive a fourth signal within a fourth frequency range. In some embodiments, the fourth frequency ranges may overlap, at least in part, with the first frequency range. Additionally or alternatively, the fourth frequency range may overlap, at least in part, with the second frequency range.

In some embodiments, the activated state may be determined by the electronic device being powered on and the de-activated state may be determined by the electronic device not being powered on. In other embodiments, the activated state may correspond to the electronic device being in a state for transmitting a fourth signal and the de-activated state may correspond to the electronic device not being in a state for transmitting the fourth signal. In yet other embodiments, the activated state may correspond to the to the electronic device being in a state for receiving a fourth signal and the de-activated state may correspond to the electronic device not being in a state for receiving the fourth signal.

In accordance with another aspect of the present disclosure, a device is disclosed. The device may comprise a passive radio frequency identification tag, an antenna, and a switch. The passive radio frequency identification tag may be operable to communicate a first signal in the presence of a second signal. The antenna may be communicatively connected to the passive radio frequency identification tag and operable to transmit the first signal. The switch may be communicatively disposed between the passive radio frequency identification tag and the antenna. Further, the switch may be operable to receive a third signal from an electronic device. The third signal may correspond to an activated state of the electronic device. Additionally, based on the received third signal, the switch may be operable to disable communication between the passive radio frequency identification tag and the antenna. The disabled communication between the passive radio frequency identification tag and the antenna may prevent signal interference with the electronic device.

In some embodiments, the activated state may correspond to the electronic device being powered on. In other embodiments, the activated state may correspond to the electronic device being in a state for, at least one of, wirelessly transmitting and receiving a fourth signal. In some embodiments, the fourth signal may have a fourth frequency range that, at least in part, overlaps a second frequency range of the second signal. In other embodiments, the fourth signal may have a fourth frequency range that overlaps, at least in part, a first frequency range of the first signal.

In accordance with yet another aspect of the present disclosure, a method is disclosed. The method may comprise receiving a first signal and opening a switch. The first signal may be received from an electronic device. Additionally, the first signal may correspond to the electronic device being in an activated state. Opening the switch may operably prevent communication between a passive RFID tag and an antenna. In some embodiments, the electronic device may be operable to wirelessly transmit a second signal to a second device. The prevent communication between the passive RFID tag and the antenna may be operable to prevent the transmission of a third signal from the passive RFFID tag, by the antenna. Accordingly, signal interference with at least one of the electronic device and the second device may be prevented.

In some embodiments, the method may further comprise the step of closing the switch. The switch may be closed based, at least in part, on a termination of receipt of the first signal. Further, closing the switch is operable to enable communication between the passive RFID tag and the antenna.

In some embodiments, the activated state is determined by the electronic device being powered on and the de-activated state is determined by the electronic device not being powered on. In other embodiments, the activated state is determined by the electronic device being in a state for, at least one of, wirelessly transmitting and receiving a fourth signal. Accordingly, the de-activated state may similarly be determined by the electronic device not being in a state for, at least one of, wirelessly transmitting and receiving a fourth signal.

In some embodiments, the passive RFID tag is operable to communicate a third signal to the antenna in the presence of a fourth signal. The fourth signal may have a fourth range. The antenna may be operable to transmit the third signal. The third signal may have a third frequency range. The second signal may have a second frequency range. The second frequency range and the fourth frequency range may overlap, at least in part.

The technical advantages of certain embodiments of the present disclosure include reducing or eliminating a potential for the RFID chip to interfere with the normal operation of the electronic device and/or the remote device. The RFID tag and antenna, together, may be operable to transmit a RFID signal within an RFID wave range, when in the presence of a reader signal within a reader wave range. In instances where the RFID signal is also, at least in part, within a range of signals transmitted and/or received by the electronic and/or remote devices, false signals or signal interference may occur between the electronic device and remote device. However, the interference from normal operation is reduced or eliminated, because the switch may prevent transmission of the RFID signal when the electronic device is activated.

DETAILED DESCRIPTION

For the purposes of description herein, the specific devices and processes illustrated in the attached drawings and described in this disclosure are simply exemplary embodiments of the inventive concepts defined in the appended claims. Hence, specific characteristics relating the embodiments disclosed herein are not to be considered as limiting, unless the claims expressly state otherwise.

The present disclosure is directed to systems and methods for reducing and/or eliminating signal interference by proximate devices. To achieve this reduction and/or elimination, switches responsive to proximate electronic devices entering an active state may be implemented to disable proximate devices from transmitting a signal. Radio frequency identification "RFID" tags may be particularly suited for such a system.

Figure 1:
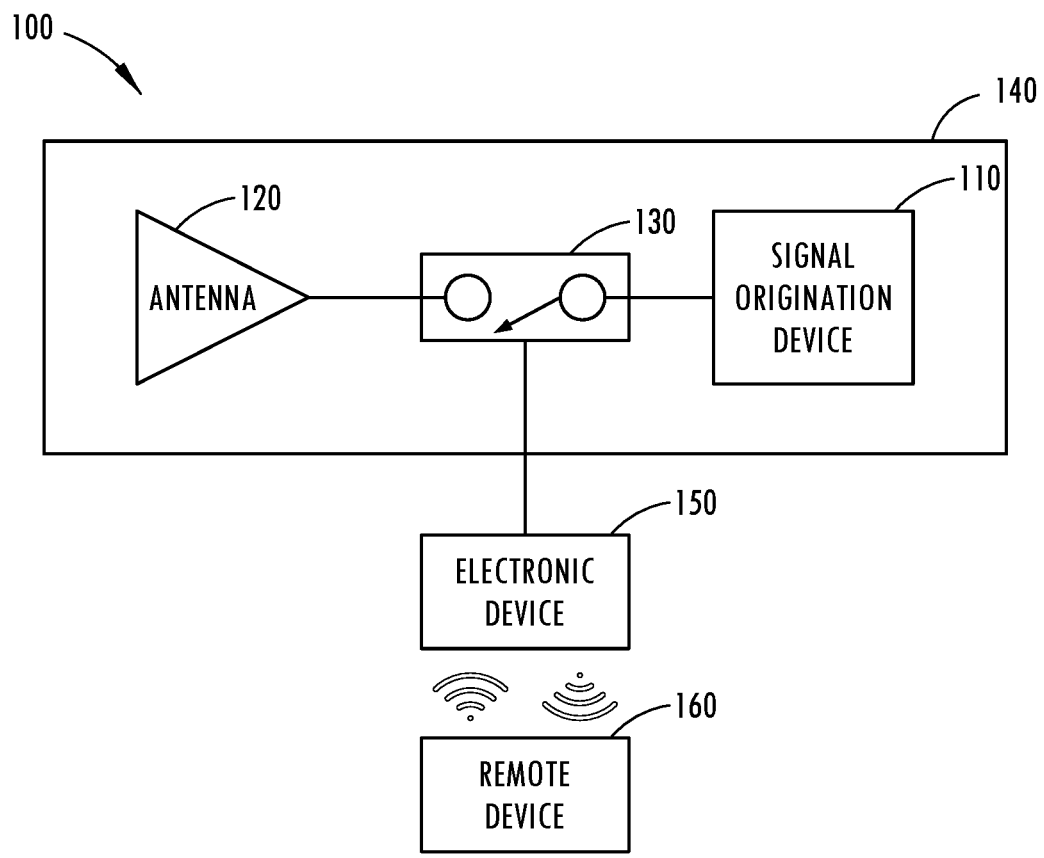
FIG. 1: A schematic representation of a reduced interference transmission system.

FIG. 1 is a schematic representation of a reduced interference transmission system 100. Reduced interference transmission system 100 may comprise a signal origination device 110, an antenna 120, and/or a switch 130. Additionally, in some embodiments, reduced interference transmission system 100 may further comprise a carrier substrate 140.

Signal origination device 110 is a device operable to communicate a first signal for transmission by antenna 120. The first signal having or being in a first frequency range. The first frequency range may be, for example, about 125-134.2 kHz, 3-30 MHz, 13.56 MHz, 300-1000 MHz, 433 MHz, 902-928 MHz, 918-928 MHz, 908.5-914 MHz, 866-869 MHz, 923-925 MHz, 950-956 MHz, 865-868 MHz, 902-928 MHz, 864-929 MHz, 860-960 MHz, 1-10 GHz, 2.45 GHz, and/or 5.8 GHz. Further, in some embodiments, the first signal may correspond to information regarding a device associated with signal origination device 110, such as the device's serial number. Accordingly, the information contained in the first signal may be used for inventory tracking.

In some embodiments, signal origination device 110 may be an RFID tag. RFID tags are small devices that may be integrated into or affixed onto items in order to provide information electronically. The information often relates to identification and/or tracking of an item they are associated with. Further, RFID tags come in two forms, active RFID tags and passive RFID tags.

An active RFID tag transmits the first signal, which may be received by an RFID reader when the RFID reader is within range of the first signal's range. However, active RFID tags have the disadvantage of requiring a connection to a power source. Accordingly, in embodiments where signal origination device 110 is an active RFID tag, signal origination device 110 may comprise and/or be connected to a power source.

Passive RFID tags, on the other hand, do not require a connection to a power source. Passive RFID tags may receive sufficient power by way of receiving a second signal, and thus activate in the presence of the second signal. The second signal has or is within a second frequency range. Further, the second signal may originate from an RFID reader. Accordingly, upon being powered via the second signal, the passive RFID tag may communicate the first signal, which may in turn be received by the RFID reader after transmission by antenna 120. While passive RFID tags have the advantage of not requiring a connection to a power source, passive RFID tags may experience unintentional or undesirable activation. Accordingly, in embodiments where signal originating device 110 is a passive RFID tag, signal originating device 110 is further operable to communicate the first signal in the presence of a second signal, the second signal being in a second frequency range. The second frequency range may be, for example, any of the ranges suitable for the first frequency range. The first and second frequency ranges may be the same or different.

Antenna 120 is communicatively connected to signal origination device 110. Further, antenna 120 is configured to wirelessly transmit signals received by antenna 120, such as the first signal. Antenna 120 may also be configured to receive wireless signals. For example, antenna 120 may be a flat induction coil, an induction coil on a ferrous core, a single dipole, or a double dipole antenna.

Switch 130 is communicatively disposed between signal origination device 110 and antenna 120. Further, switch 130 is a device operable between open and closed states where an open state breaks an electrical circuit and a closed state completes an electrical circuit. For example, switch 130 may be a transistor, a mosfets, and/or a relay type switch. Additionally, switch 130 is operable to receive a third signal from an electronic device 150. Further, based, at least in part, on the receipt of the third signal, switch 130 is further operable to open and thus disable communication between signal origination device 110 and antenna 120. Likewise, switch 130 may be operable to close and thus enable communication between signal origination device 110 and antenna 120 when the third signal has not been and/or is not being received from electronic device 150.

Carrier substate 140 comprises a first substrate having a first and a second side. Further, carrier substrate 140 may be any device operable to physically receive and/or house: signal origination device 110, antenna 120, and/or switch 130. In some embodiments, the first substrate may be a printed circuit board. Accordingly, signal origination device 110, antenna 120, and switch 130 may be disposed on the first side. The second side may comprise an adhesive.

Electronic device 150 may be any device operable to transmit and/or receive a wireless fourth signal, having a fourth frequency range, to and/or from a remote device 160. Remote device 160 may likewise be any device operable to transmit and/or receive the wireless fourth signal to and/or from electronic device 150. The fourth frequency range may be, for example, any of the ranges suitable for the first frequency range. Further, the fourth frequency range may be the same or different as the first and/or second frequency ranges. Electronic device 150, for example, may be a cell phone, a medical device, a rear-view mirror, a garage door controller, an integrated toll module, or other device. Additionally, electronic device 150 is operable between activated and de-activated states. Further, electronic device 150 is directly or indirectly connected to switch 130 and operable to send a third signal to switch 130. The third signal may correspond to the electronic device's 150 status of being in an activated or de-activated state. The third signal may be a power signal or other signal. An activated state may correspond to electronic device 150 being turned on, connected to a power source, or being in or entering a state for transmitting and/or reviving the fourth signal. Likewise, a de-activated state may correspond to electronic device 150 being turned off; lacking a power source; or exiting and/or not being in a state for transmitting and/or receiving the fourth signal. In some embodiments, the fourth frequency range may overlap, at least in part, with the first and/or second frequency ranges. Additionally, in some embodiments, interference reduction system 100 may be disposed on electronic device 150.

Figure 2:
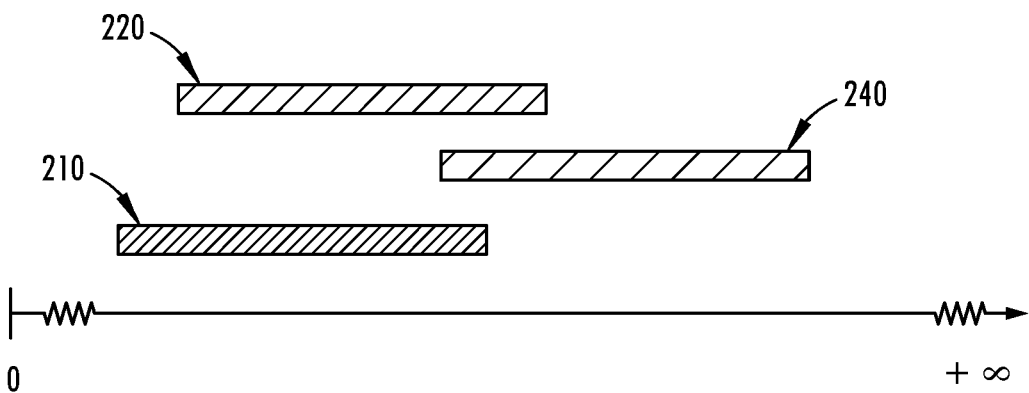
FIG. 2: A relative signal frequency range schematic.

In operation, switch 130 may automatically reconfigure to an open position in response to receiving the third signal from electronic device 150. Accordingly, upon switch 130 receiving the third signal, transmissions by antenna 120 may be disabled. Further, since the third signal may correspond to electronic device 150 being in an activated and/or de-activated state, reduced interference transmission system 100 may have the advantage of eliminating or reducing the potential of signal origination device 110 interfering with normal operation of electronic device 150 and/or remote device 160. As illustrated in FIG. 2, a relative signal frequency range schematic illustration, in some instances, the fourth frequency range 240 may overlap with the second frequency range 220, and without switch 130, antenna 120 could transmit the first signal 210, in response to a false receipt of a second signal 220. This transmission of the first signal 210 could cause signal interference, particularly in embodiments where antenna 120 is disposed on electronic device 150. Additionally or alternatively, the first frequency range 210 may overlap with the fourth frequency range 240, causing false signals and/or signal interference with or between electronic device 150 and/or remote device 160.

Figure 3:
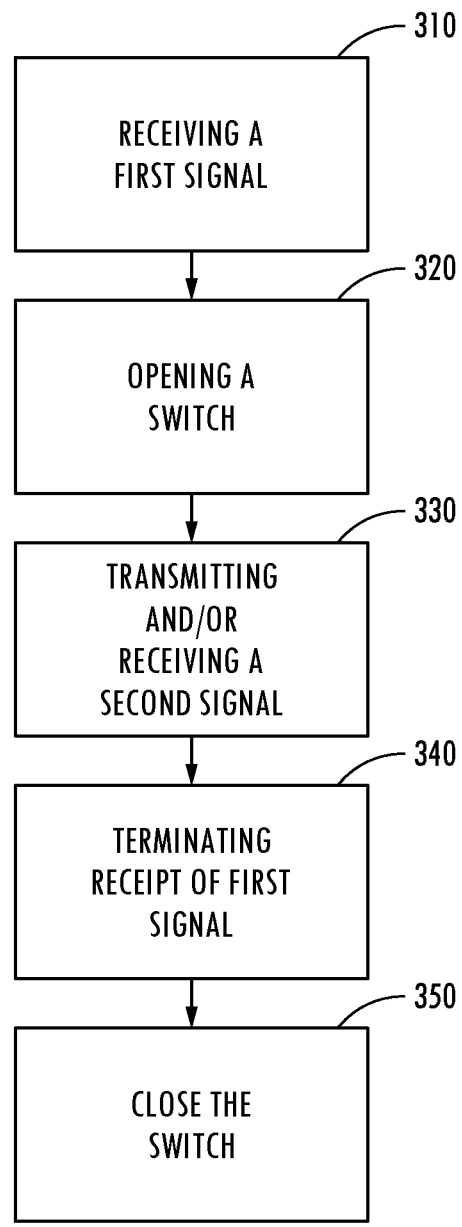
FIG. 3: A process flow diagram for reduced interference transmissions.

FIG. 3 is a process flow diagram for reduced interference transmissions. The process comprises the steps of receiving a first signal 310 and opening a switch 320. Additionally, in some embodiments, the process may further comprise one or more of the steps of transmitting and/or receiving a second signal 330, terminating receipt of first signal 340, and closing the switch 350.

Receiving a first signal 310 may be done by a switch. The first signal may originate from an electronic device. Further, the first signal may correspond to the electronic device status of being in an activated or de-activated state. An activated state may correspond to the electronic device being turned on, connected to a power source, or being in or entering a state for transmitting and/or reviving a second signal. Likewise, a de-activated state may correspond to the electronic device being turned off; lacking a power source; or exiting and/or not being in a state for transmitting and/or receiving the second signal. The second signal may be within a second wave range.

In response to receiving the first signal 310, the next step of the process is to open a switch 320. The switch may be communicatively disposed between a signal origination device and an antenna. The signal origination device may be a passive or an active RFID tag. Accordingly, opening the switch is operable to disable communication between the signal origination device and the antenna.

In some embodiments, the electronic device may be operable to wirelessly transmit and/or receive a second signal. Accordingly, while the switch is open, the process may comprise the step of transmitting and/or receiving the second signal. Further, the transmission and/or receipt may be done by an electronic device in communication with a remote device. The remote device may likewise be any device operable to transmit and/or receive the wireless second signal to and/or from the electronic device.

In further embodiments, the receipt of the first signal may be terminated 340, reflecting the electronic device entering a de-activated state. Accordingly, in response, the switch may be operable to reconfigure and close, thereby enabling communication between the signal origination device and the antenna.

Accordingly, the process has the advantage of reducing or eliminating a potential for the signal origination device to interfere with the normal operation of the electronic device and/or the remote device. The signal origination device and antenna, together, may be operable to transmit a third signal within a third wave range, when in the presence of a fourth signal within a fourth wave range. Further, in instances where the second signal is, at least in part, within the third and/or fourth wave ranges, false signals or signal interference may occur between the electronic device and remote device. However, interference with normal operation is reduced or eliminated, because, the switch may be opened to prevent transmission of the third signal.

In this document, relational terms, such as "first," "second," "third," and the like, are used solely to distinguish one entity or action from another entity or action, without necessarily requiring or implying any actual such relationship or order between such entities or actions.

As used herein, the term "and/or," when used in a list of two or more items, means that any one of the listed items can be employed by itself, or any combination of the two or more of the listed items can be employed. For example, if a composition is described as containing components A, B, and/or C, the composition can contain A alone; B alone; C alone; A and B in combination; A and C in combination; A and C in combination; B and C in combination; or A, B, and C in combination.

The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

It is to be understood that although several embodiments are described in the present disclosure, numerous variations, alterations, transformations, and modifications may be understood by one skilled in the art, and the present disclosure is intended to encompass these variations, alterations, transformations, and modifications as within the scope of the appended claims, unless their language expressly states otherwise.

What is claimed is:

1. A system comprising:
   a signal origination device operable to communicate a first signal when in a presence of a second signal, the first signal within a first frequency range and the second signal within a second frequency range;
   a switch connected to the signal origination device;
   an antenna connected to the switch, the antenna operable to transmit the first signal; and an electronic device operable to wirelessly communicate with a remote device via a fourth signal, the electronic device:
   being at least one of a cell phone, a medical device, a rear-view mirror, a garage door controller, and an integrated toll module,
   connected to the switch,
   operable between:
      an activated state where the electronic device is operable to at least one of:
         wirelessly receive the fourth signal from a remote device, and transmit a fifth signal to the remote device, and
      a de-activated state, and
   operable to send a third signal to the switch, the third signal corresponding to the electronic device being in the activated state;
   wherein, the switch is operable to open in response to receiving the third signal, preventing communication between the signal origination device and the antenna and reducing the potential for the first signal transmitted by the antenna to interfere with the wireless communication between the electronic device and the remote device.

2. The system of claim 1, wherein the electronic device, when in the activated state, is operable to transmit the fifth signal within a fourth frequency range, the fourth frequency range overlapping, at least in part, with the first frequency range.

3. The system of claim 1, wherein the electronic device, when in the activated state, is operable to receive the fourth signal within a fourth frequency range, the fourth frequency range overlapping, at least in part, with the first frequency range.

4. The system of claim 1, wherein the electronic device, when in the activated state, is operable to transmit the fifth signal within a fourth frequency range, the fourth frequency range overlapping, at least in part, with the second frequency range.

5. The system of claim 1, wherein the electronic device, when in the activated state, is operable to receive the fourth signal within a fourth frequency range, the fourth frequency range overlapping, at least in part, with the second frequency range.

6. The system of claim 1, wherein the activated state is determined by the electronic device being powered on and the de-activated state is determined by the electronic device not being powered on.

7. The system of claim 1, wherein the activated state corresponds to the electronic device being in a state for transmitting the fifth signal.

8. The system of claim 1, wherein the activated state corresponds to the electronic device being in a state for receiving the fourth signal.

9. A device comprising:
   a passive radio frequency identification tag operable to communicate a first signal in the presence of a second signal;
   an antenna communicatively connected to the passive radio frequency identification tag and operable to transmit the first signal; and
   a switch communicatively disposed between the passive radio frequency identification tag and the antenna, the switch operable to:
      receive a third signal from an electronic device, the electronic device being at least one of a cell phone, a medical device, a rear-view mirror, a garage door controller, and an integrated toll module, the third signal corresponding to an activated state of the electronic device where the electronic device is operable to wirelessly communicate a fourth signal with a remote device, and
      in response to receiving the third signal, the switch opens and disable communication between the passive radio frequency identification tag and the antenna, preventing the first signal from interfering with the wireless communication between the electronic device and the remote device.

10. The device of claim 9, wherein the activated state corresponds to the electronic device being powered on.

11. The device of claim 9, wherein:
    the second signal has a second frequency range;
    the fourth signal has a fourth frequency range; and
    the second frequency range and the fourth frequency range overlap, at least in part.

12. The device of claim 9, wherein:
    the first signal has a first frequency range;
    the fourth signal has a fourth frequency range; and
    the first frequency range and the fourth frequency range overlap, at least in part.

13. The device of claim 9, wherein the disabled communication between the passive radio frequency identification tag and the antenna prevents the first signal from interfering with the electronic device's transmission of the fourth signal.

* * * * *